US 12,197,730 B2

(12) United States Patent
Raghavendra et al.

(10) Patent No.: US 12,197,730 B2
(45) Date of Patent: Jan. 14, 2025

(54) METHODS AND APPARATUS TO SCHEDULE MEMORY OPERATIONS

(71) Applicant: Texas Instruments Incorporated, Dallas, TX (US)

(72) Inventors: Vignesh Raghavendra, Bangalore (IN); Srirama Govindarajan, Bangalore (IN); Mihir Mody, Bangalore (IN); Prithvi Y. A., Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/848,159

(22) Filed: Jun. 23, 2022

(65) Prior Publication Data

US 2023/0418472 A1 Dec. 28, 2023

(51) Int. Cl.
*G06F 3/06* (2006.01)
(52) U.S. Cl.
CPC .......... *G06F 3/0611* (2013.01); *G06F 3/0632* (2013.01); *G06F 3/0679* (2013.01)
(58) Field of Classification Search
CPC ..... G06F 3/0611; G06F 3/0632; G06F 3/0679
See application file for complete search history.

(56) References Cited

U.S. PATENT DOCUMENTS

| 7,032,081 | B1* | 4/2006 | Gefen | G06F 15/7814 |
| | | | | 711/103 |
| 11,768,607 | B1* | 9/2023 | Deng | G06F 3/0679 |
| | | | | 711/103 |
| 2018/0004410 | A1* | 1/2018 | Madraswala | G06F 3/0679 |
| 2022/0179585 | A1* | 6/2022 | Muthiah | G06F 3/0625 |

FOREIGN PATENT DOCUMENTS

WO WO-2010076598 A1 * 7/2010 ......... G06F 12/0246

\* cited by examiner

*Primary Examiner* — Kalpit Parikh
(74) *Attorney, Agent, or Firm* — Xianghui Huang; Frank D. Cimino

(57) ABSTRACT

An example device includes: a compute core configured to: send a first request to flash manager circuitry, the first request to store write data in a flash memory; and send a second request to the flash manager circuitry, the second request sent after the first request, the second request to transfer an XIP read operation to the flash memory; the flash manager circuitry configured to: receive the first request; transmit the write data to the flash memory for storing in the flash memory; receive the second request before the storing of the write data is complete; determine whether to preempt the storing of the write data, transmit, in response to a determination to preempt, the XIP read operation to the flash; and the flash memory configured to provide data to the compute core based on the transmitted XIP read operation.

20 Claims, 9 Drawing Sheets

METHODS AND APPARATUS TO SCHEDULE MEMORY OPERATIONS

TECHNICAL FIELD

This description relates generally to memory, and more particularly to methods and apparatus to schedule memory operations.

BACKGROUND

A System on a Chip (SoC) is an integrated circuit that includes most or all of the resources of a compute device. A SoC may have on-chip resources such as one or more processors, memories, peripheral interfaces, etc. In some examples, the SoC may implement specific functions such as graphics, audio, image processing, etc.

A SoC may have limited memory resources on-chip due to constraints related to size, cost, etc. Therefore, some SoCs may store data in external non-volatile memory using an Execute in Place (XIP) protocol. An XIP protocol allows a processor on the SoC to read data directly from external non-volatile memory and execute instructions using the data. With an XIP protocol, data communication between an external non-volatile memory and the on-chip processor does not require an intermediate step of transferring data to and from an on-chip volatile memory circuit.

SUMMARY

For methods and apparatus to schedule operations with external memory, an example SoC includes: a compute core configured to: send a first request to flash manager circuitry, the first request to store write data in a flash memory; and send a second request to the flash manager circuitry, the second request sent after the first request, the second request to transfer an XIP read operation to the flash memory; the flash manager circuitry configured to: receive the first request; transmit the write data to the flash memory for storing in the flash memory; receive the second request before the storing of the write data is complete; determine whether to preempt the storing of the write data, transmit, in response to a determination to preempt, the XIP read operation to the flash; and the flash memory configured to provide data to the compute core based on the transmitted XIP read operation.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
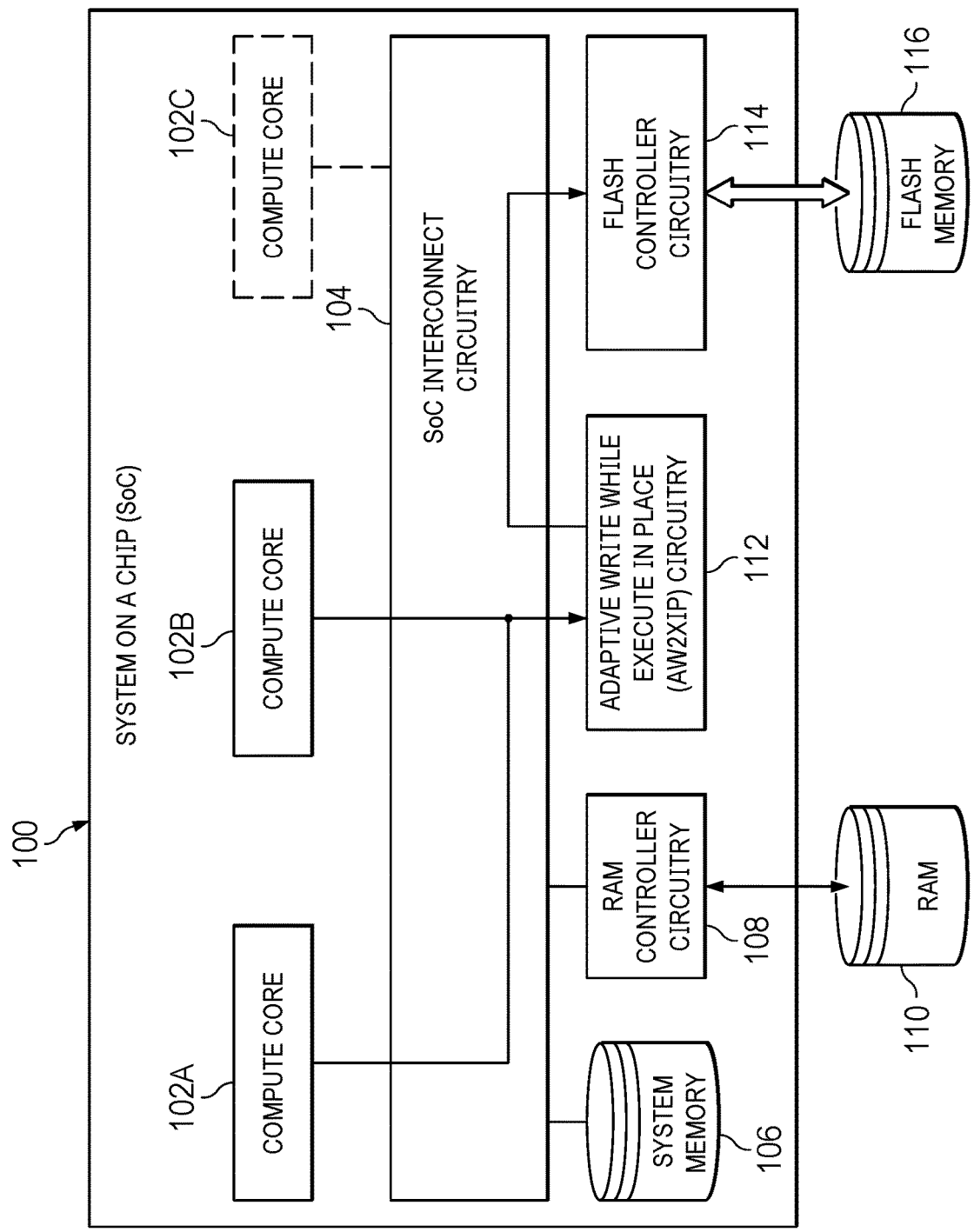
FIG. 1 is a block diagram of an example implementation of an SoC.

The drawings are not necessarily to scale. Generally, the same reference numbers in the drawing(s) and this description refer to the same or like parts. Although the drawings show layers and regions with clean lines and boundaries, some or all of these lines and/or boundaries may be idealized. In reality, the boundaries and/or lines may be unobservable, blended and/or irregular.

Many industries use SoCs with relatively limited resources (e.g. volatile memory) to control costs. For example, the automotive industry uses SoCs with limited memory resources for over the air (OTA) communication. OTA refers to technology used to remotely communicate with an electronic control unit (ECU) in a vehicle. For example, OTA may be used to wirelessly update the software or firmware of an ECU. In some examples, due to limited on-chip memory, an SoC may write data to an external volatile memory while the SoC also reads data from the external memory using an XIP read. As used herein, an XIP read may refer to a process that an SoC uses to read data from an external volatile memory using an XIP protocol.

Support for an SoC to concurrently perform XIP read operations and write operations using the same external memory includes challenges. For example, many memory controller circuits utilized by SoCs use different transfer modes to process XIP read operations and write operations. As such, a mechanism is needed to switch between transfer modes. Additionally, many SoCs may execute software applications that prioritize XIP read operations over write operations. However, write operations can require significant amounts of time that may negatively affect XIP downtime requirements. XIP downtime requirements refer to an amount of time between when a software application has requested an XIP read operation and when the read operation is transferred to memory. For example, a write operation of a Not Or (NOR) logic based Serial Peripheral Interface (SPI) flash memory, which is an example of one type of external non-volatile memory, may require up to 1.5 milliseconds (ms) to overwrite 512 bytes of data, while an example software application running on an SoC may require any stoppage of XIP read operations to be limited to 100 microseconds ($\mu$s) or less in duration to prevent errors in time sensitive operations.

Previous implementations of SoCs to support write and XIP read operations may cause large periods of XIP downtime during write operations, increase bill of materials part count, and/or require extra compute resources, such as two controllers or additional on-chip memory.

Example methods and apparatus described herein offer cost-effective solutions to support write and XIP read operations while minimizing XIP downtime and required compute resources. Example adaptive write while execute in place (AW2XIP) circuitry receives write requests and XIP read requests from compute cores on a SoC. Based on the requests, the example AW2XIP circuitry sends operations to memory controller circuitry according to prioritization methods in which real-time (RT) XIP read operations take priority over best-effort XIP read operations, which take priority over write operations. The example AW2XIP circuitry may additionally pre-empt a write operation in progress to perform a RT XIP read operation. In some examples, the example AW2XIP circuitry also estimates write operation completion status to minimize polling operations to external volatile memory during write operations.

FIG. 1 is a block diagram of an example implementation of a SoC. The example of FIG. 1 includes an example SoC 100, example random access memory (RAM) 110, and example flash memory 116. The example SoC 100 includes example compute cores 102A, 102B, 102C, example SoC interconnect circuitry 104, example system memory 106, example RAM controller circuitry 108, example AW2XIP circuitry 112, and example flash controller circuitry 114.

The example SoC 100 supports concurrent read XIP and write operations according to the teachings of this disclosure. Example SoCs configured in accordance with the examples described herein may be used for any purposes and applications. In some examples, the SoC 100 may be used in automotive applications.

The example compute cores 102A, 102B, 102C execute machine readable instructions to run one or more software applications. Some of the instructions may be stored in the flash memory 116 and retrieved using XIP read operations. Accordingly, in examples described herein, the compute cores 102A, 102B may execute one or more software applications that use XIP read operations and write operations to communicate with the example flash memory 116. In such examples, the example compute cores 106C may implement software applications that do not interface with the example flash memory 116.

The example compute cores 102A, 102B, 102C may be instantiated by any form of processor circuitry. Example processor circuitry may include, but is not limited to, programmable microprocessors, Field Programmable Gate Arrays (FPGAs) that may instantiate instructions, Central Processor Units (CPUs), Graphics Processor Units (GPUs), Digital Signal Processors (DSPs), microcontrollers and integrated circuits such as Application Specific Integrated Circuits (ASICs), etc. In some examples, one or more of the example compute cores may be implemented by a different type of processor circuitry from the remaining compute cores. While FIG. 1 illustrates three compute cores 102A, 102B, 102C, the example SoC 100 may include any number of compute cores.

The example SoC interconnect circuitry 104 enables the transfer of data between various components in the example SoC 100. For example, the example compute cores 102A, 102B may send one or more operations to the example AW2XIP circuitry 112 via the SoC interconnect circuitry 104. In turn, the example AW2XIP circuitry 112 may provide data to the example flash controller circuitry 114 via the example SoC interconnect circuitry 104. The example SoC interconnect circuitry 104 may be implemented by communication buses and/or networks to facilitate data transfer. In some examples, the example SoC interconnect circuitry 104 may enable other data transfer between components of the SoC 100 in addition to the data transfers that are explicitly illustrated in FIG. 1.

The example system memory 106 is an amount of memory implemented on-chip. The example compute core 102C may use the example system memory 106 to execute operations that are not executed directly from the example flash memory 116. The example system memory 106 may be implemented by any type of memory. In examples where the SoC 100 has limited compute resources, the size of the example system memory 106 may be constrained in comparison to other SoCs.

The example RAM controller circuitry 108 manages the transfer of data to and from the example RAM 110. For example, the RAM controller circuitry 108 may receive a request from the example compute core 102C via the example SoC interconnect circuitry 104 to read data from or write data to the example RAM 110. Based on the request, the example RAM controller circuitry 108 may transfer requested data from the example RAM 110 to the example compute core 102C via the example SoC interconnect circuitry 104 or transfer provided data to the example RAM 110.

The example RAM 110 is an amount of volatile memory that is external to the example SoC 100. The example core 106C may use the example RAM 110 when executing machine readable instructions that do not involve the example flash memory 116. In some examples, the example RAM may be implemented by double data rate (DDR) RAM to increase communication speeds with the example SoC 100.

The example AW2XIP circuitry 112 receives requests from the example compute cores 102A, 102B that are intended for the example flash memory 116. Based on the requests, the AW2XIP circuitry 112 sends operations to the example flash controller circuitry 114 in a manner that allows for concurrent read XIP operations and write operations while also reducing or minimizing XIP downtime. In some examples, the AW2XIP circuitry may be referred to as memory manager circuitry. The example AW2XIP circuitry 112 is described further in connection with the examples shown in FIGS. 2-9.

The example flash controller circuitry 114 manages data transfer to and from the example flash memory 116. For example, the flash controller circuitry 114 may receive an operation from the example AW2XIP circuitry 112 via the example SoC interconnect circuitry 104 to read data from or write data to the example flash memory 116. Based on the operation, the example flash controller circuitry 114 may transfer data that composes the operation to the example flash memory 116. In response to transferred operation data, the example flash controller circuitry 114 may also receive data from the flash memory 116 and transfer the response data to the example compute cores 102A, 102B via the example SoC interconnect circuitry 104. The example flash controller circuitry 114 may operate in a read mode used to send read operations (including XIP read operations and other read operations) to the example flash memory 116 and receive data in response to the read operations. The example flash controller circuitry 114 may operate in a write mode to transmit updates or other write data to the example flash memory 116. The example flash controller circuitry 114 may be required to switch between modes to transmit both XIP read requests and write data.

The example flash memory 116 is an amount of non-volatile memory that supports XIP operations. For example, the flash memory 116 may be a RAW flash device such as a Serial NOR flash device. The example flash memory 116 may send and receive data with the flash controller circuitry 114 using a communication standard that supports one or more XIP protocols. For example, the example flash memory 116 and example flash controller circuitry 114 may use the Octal Serial Peripheral Interface (OSPI) standard to communicate. The example flash memory 116 may be implemented with or without read while write (RWW) functionality. In some examples, the example flash memory 116 may be implemented in an ECU of a vehicle. In such examples, the example compute cores 102A, 102B may implement software applications that write data to the example flash memory 116 to update the ECU. While examples disclosed herein refer to the example flash memory 116 as external to the example SoC 100 in FIG. 1, in other examples, the flash memory 116 may be an internal SoC flash device.

The example AW2XIP circuitry 112 may receive a plurality of requests from the example compute cores 102A, 102B. Some requests made by the example compute cores 102A, 102B may come from a software application and include write operations to the flash memory 116. At the same time, other requests made by the example compute cores 102A, 102B may come from other software applications and include XIP read operations. Some of the XIP read related requests may correspond to RT software applications, while other XIP related requests may correspond to non-RT software applications. As used herein, an RT software application refers to a software application that performs operations with critically defined time constraints. The example AW2XIP circuitry 112 manages the plurality of requests so that XIP downtime is minimized, RT XIP read operations are prioritized, and write operations are performed concurrently with XIP read operations.

Figure 2:
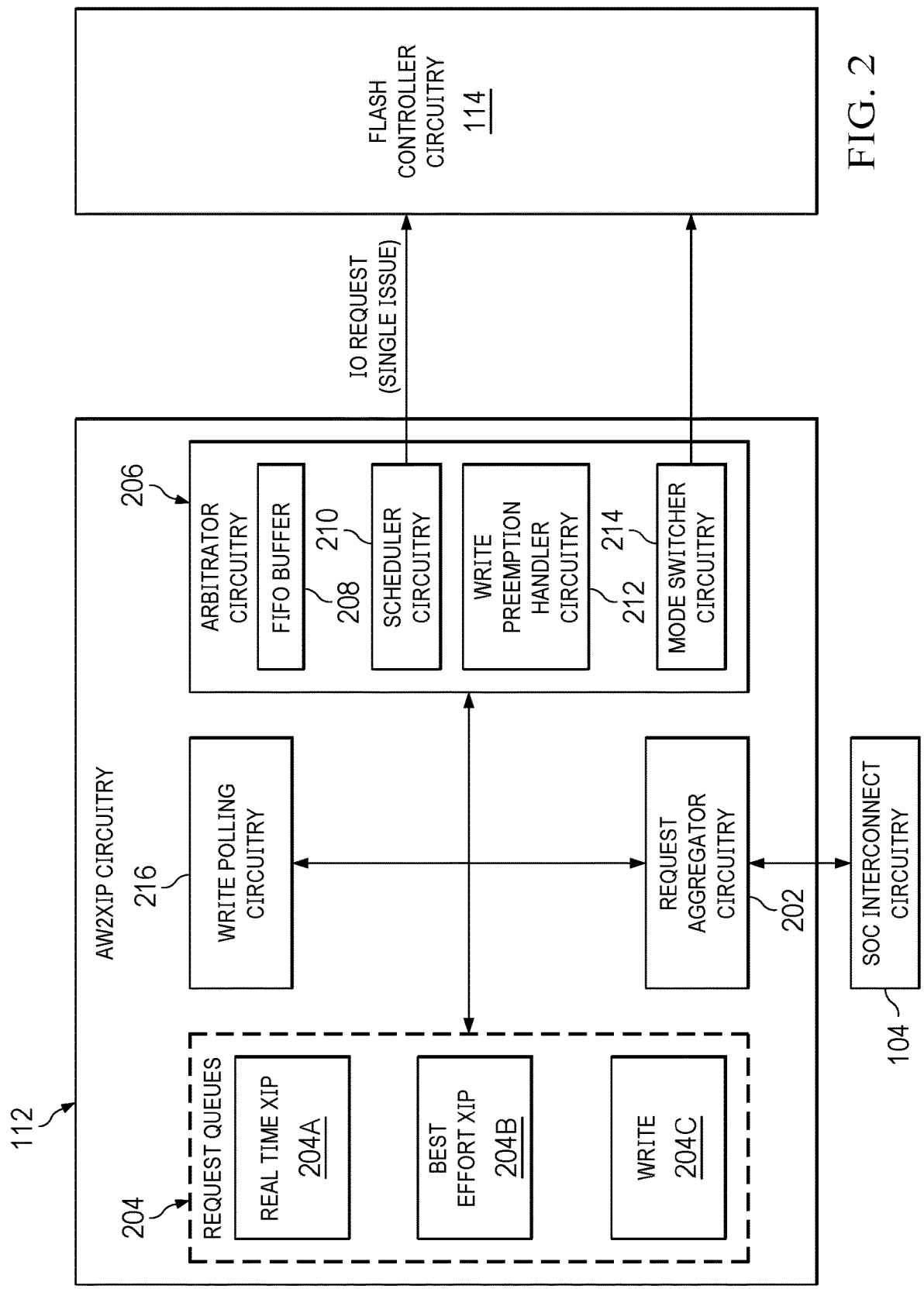
FIG. 2 is a block diagram of an example implementation of the Adaptive Write While Execute In Place (AW2XIP) circuitry of FIG. 1.

FIG. 2 is a block diagram of an example implementation of the AW2XIP circuitry of FIG. 1. The example AW2XIP circuitry 112 includes example request aggregator circuitry 202, example request queues 204, example arbitrator circuitry 206, and example write polling circuitry 216.

The example request queues 204 include an example RT XIP queue 204A, an example best effort XIP queue 204B, and an example write queue 204C. Other queues are possible. The example arbitrator circuitry 206 includes an example First In First Out (FIFO) buffer 208, mode switcher circuitry 214, write preemption handler circuitry 212, and example scheduler circuitry 210.

The example request aggregator circuitry 202 receives requests from the example compute cores 102A, 102B via the SoC interconnect circuitry 104. The requests may be for a RT XIP read operation, a best effort XIP read operation, or a write operation. As used herein, a best effort XIP read operation refers to an XIP read that is requested by a non-RT software application. The example request aggregator circuitry 202 may move RT XIP requests into the RT XIP queue 204A, move best effort XIP requests into the best effort XIP queue 204B, and move write requests to the FIFO buffer 208.

The example request queues 204 are memory circuits that store data corresponding to each type of operation. Each of the example request queues 204 may be implemented as a priority queue. As such, the entries in the example request queues 204 each have a prioritization value that dictate when data for the given operation is accessed by the example scheduler circuitry 210. As used herein, the "top" of a given queue refers to the index of the data with the highest prioritization value. Prioritization values may be localized to a given queue such that each of the RT XIP queue 204A, example best effort XIP queue 204B, and example write queue 204C may contain operation data considered to be at the top of their respective queues.

The example FIFO buffer 208 refers to an amount of memory that data is retrieved from in the order that the data is initially stored. The example FIFO buffer 208 may store data from multiple write operations at the same time. As such, the total amount of data in the FIFO buffer 208 may increase over time. When a target amount of data is stored within the FIFO buffer, the example write preemption handler circuitry 212 may divide the data into sub-blocks and add each sub-block to the write queue 204C as separate entries. The example FIFO buffer 208 is described further in connection to FIG. 6.

The example scheduler circuitry 210 determines when to send data to the example flash controller circuitry 114. For example, when new operation data is stored in one of the example request queues 204, the example scheduler circuitry 210 may remove the operation from the queue it was stored in and provide said operation to the example flash controller circuitry 114. If more than one of the request queues 204 contain an operation, the example scheduler circuitry 210 determines the order in which the operations are provided to the example flash controller circuitry 114 based on a prioritization method. If a given request queue contains more than one operation, the example scheduler circuitry 210 may select the operation at the top of the queue. The example scheduler circuitry 210 is described further in connection to FIGS. 4, 5, 9.

The example write preemption handler circuitry 212 handler saves, in response to instructions from the example scheduler circuitry 210, context data that describes the state of the write data storage in the example flash memory 116 before it was stopped. The example write preemption handler circuitry 212 may then place the context data at top of the write queue 204C.

The example mode switcher circuitry 214 changes the mode of the example flash controller circuitry 114. For example, the example mode switcher circuitry 214 may switch the example flash controller circuitry 114 between a read XIP mode and a write mode. In some examples, the example mode switcher circuitry 214 may switch the example flash controller circuitry 114 from a write mode to a XIP mode, causing the example flash memory 116 to stop any storage of write data in-progress. The example mode switcher circuitry 214 may change modes based on instructions sent from the example scheduler circuitry 210 and/or the example write preemption handler circuitry 212.

The example write polling circuitry 216 determines when a write operation is complete. The example write polling circuitry 216 may determine a given write operation is complete by estimating a completion time for the given write operation and polling the flash memory 116 via the flash controller circuitry 114 for an update the estimated completion time. After a first sub-block of write data is added to the write queue 204C, the example write preemption handler circuitry 212 may wait for an indication from the example write polling circuitry 216 that first sub-block write operation is complete before adding a second sub-block to the write queue 204C. The example write polling circuitry 216 is described further in connection to FIG. 3.

The example AW2XIP circuitry 112 receives requests for RT XIP read operations, best effort XIP read operations, and write operations that all require transmission to the example flash controller circuitry 114 and flash memory 116. The example AW2XIP circuitry 112 handles these requests concurrently and minimizes XIP downtime by implementing the example write preemption handler circuitry 212, which waits to perform write operations until enough write data is available to be divided into sub-blocks, and by implementing the write polling circuitry 216, which may put polling operations in the write queue 204C at an estimated completion time rather than generating multiple polling operations to at regular intervals. The AW2XIP circuitry 112 also implements mode switcher circuitry 214 to, based on the prioritization method and the scheduler circuitry 210, switch modes and stop a write data storage in progress. The example AW2XIP circuitry 112 additionally includes write preemption handler circuitry 212 to save write data context when the storing of write data is stopped in-progress. In doing so, the example scheduler circuitry 210 may send RT XIP read operations to the flash controller circuitry 114 in between sub-blocks of write data. As such, the example AW2XIP circuitry 112 allows RT software applications to meet constrained time restraints while concurrently supporting write operations.

Figure 3:
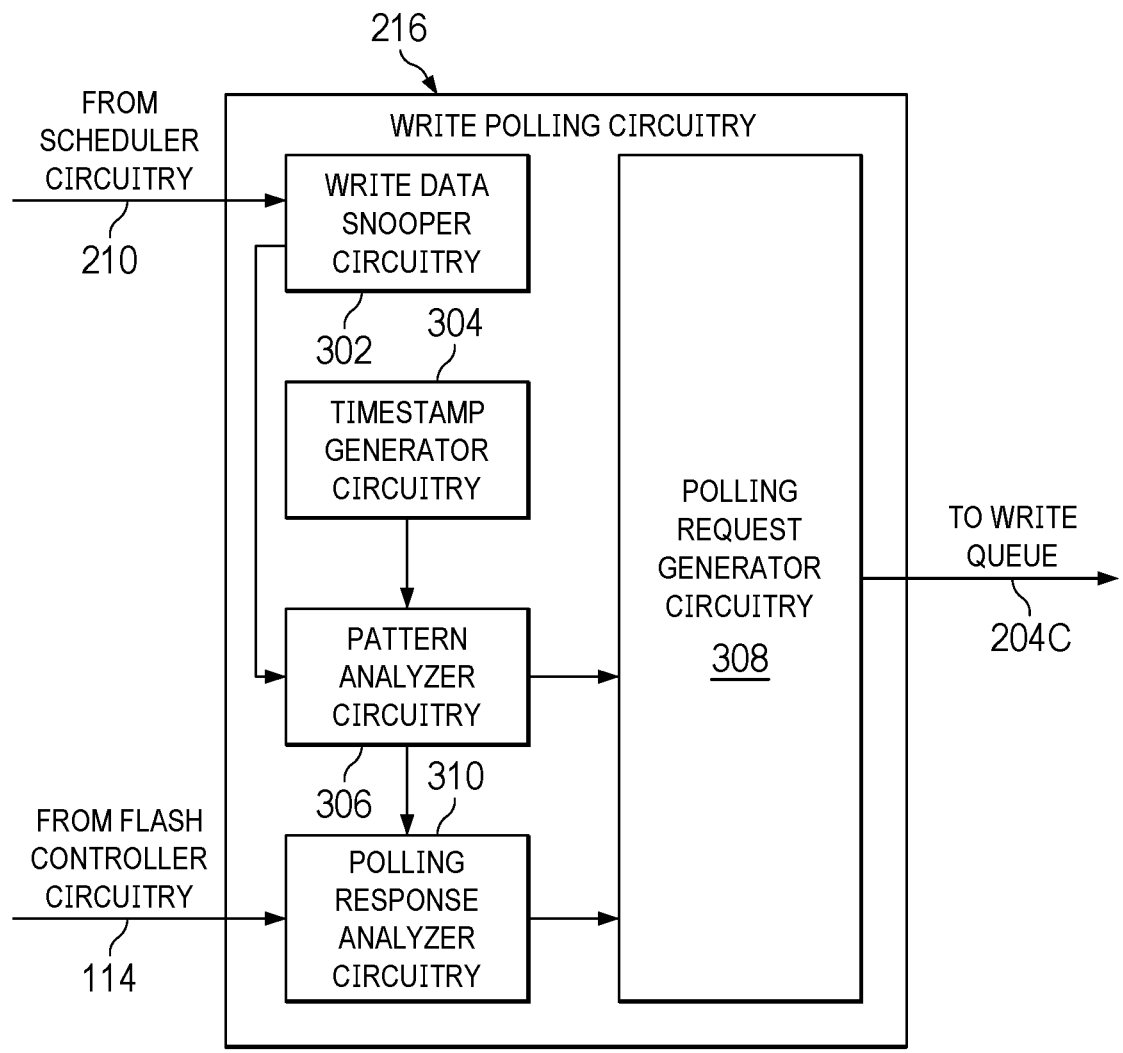
FIG. 3 is block diagram of an example implementation of the write polling circuitry of FIG. 2.

FIG. 3 is block diagram of an example implementation of the write polling circuitry of FIG. 2. The example write polling circuitry 216 includes the example timestamp generator circuitry 304, example polling response analyzer circuitry 310, example write data snooper circuitry 302, example pattern analyzer circuitry 306, and example polling request generator circuitry 308.

The example write data snooper circuitry 302 watches the flow of data from the example scheduler circuitry 210 to the example flash controller circuitry 114. In some examples, the observation of data sent from the example scheduler circuitry 210 to the example flash controller circuitry 114 may be referred to as snooping. When the example scheduler circuitry 210 sends out a sub-block of write data to be stored into the example flash memory 116, the example write data snooper circuitry 302 may access the sub-block of write data and provide it to the example pattern analyzer circuitry 306. In some examples, the example scheduler circuitry 210 may provide metadata describing the sub-block of write data to the example pattern analyzer circuitry 306 rather than the sub-block itself. The example write data snooper circuitry 302 may ignore RT XIP read operations and best effort XIP read operations sent from the scheduler circuitry 210.

The example timestamp generator circuitry 304 provides a timestamp to the example polling request generator circuitry 308. The example timestamp generator circuitry 304 is described further in connection with FIG. 8.

The example pattern analyzer circuitry 306 uses the data provided by the example write data snooper circuitry 302 and timestamp generator circuitry 304 to estimate the completion time for the sub-block of write data. As used herein, "completion time" refers to the point in time at which the storage of an amount of write data into the example flash memory 116 completes. To estimate the completion time, the example pattern analyzer circuitry 306 may analyze a pattern of previous write data transfers and their measured completion times to estimate the completion time of a current sub-block of write data being transferred. The example pattern analyzer circuitry 306 may additionally or alternatively use configuration properties to estimate completion times. The configuration properties may come from any source, including but not limited to the example flash memory 116, one or more software applications running on the example compute cores 102A, 102B, 102C, etc.

The example polling request generator circuitry 308 generates a write completion poll operation for the write data sub-block. A write completion poll is an amount of data sent to the example flash memory 116 that requests information regarding the status of the storing of the write data sub-block. To request the status update from the example flash memory 116, the example polling request generator circuitry 308 may put the write completion poll data at the top of the write queue 204C. By placing the write completion poll data at the top of the write queue 204C, the example polling request generator circuitry 308 ensures that the example scheduler circuitry 210 sends the write completion poll data before sending any additional write data sub-blocks to the example flash controller circuitry 114. The example polling request generator circuitry 308 may also wait until the estimated wait completion time to add the write completion poll operation to the write queue 204C.

The example polling response analyzer circuitry 310 receives response data from the example flash memory 116. The example polling response analyzer circuitry 310 may parse the flash memory response to determine whether the storage of the write data sub-block has completed. If the flash memory response indicates the storage of the write data sub-block has completed, the example polling response analyzer circuitry 310 may notify the example write preemption handler circuitry 212 so that additional write data sub-blocks may be added to the write queue. Alternatively, if the flash memory response indicates the storage of the write data sub-block is not yet complete, the example polling response analyzer circuitry 310 may notify the example pattern analyzer circuitry 306. In response, the example pattern analyzer circuitry 306 may update the estimated completion time and send the update to the example polling request generator circuitry 308.

In some examples, the storing of write data into the example flash memory 116 is a relatively slow process that may be pre-empted by RT XIP operations. As such, many flash controller circuits are required to verify that storage of a first amount of write data has completed before initiating storage of a second amount of write data. In previous implementations of SoCs, frequent polling of the flash memory to request status updates may lead to extended XIP downtime and/or reduced bandwidth. Advantageously, the example write polling circuitry 216 analyzes polling data history and configuration properties to wait to request a status update until the write data storage is estimated to be complete. In doing so, the example write polling circuitry 216 leaves more time for the example flash controller circuitry 114 to send XIP read operations to the example flash memory 116.

Figure 4:
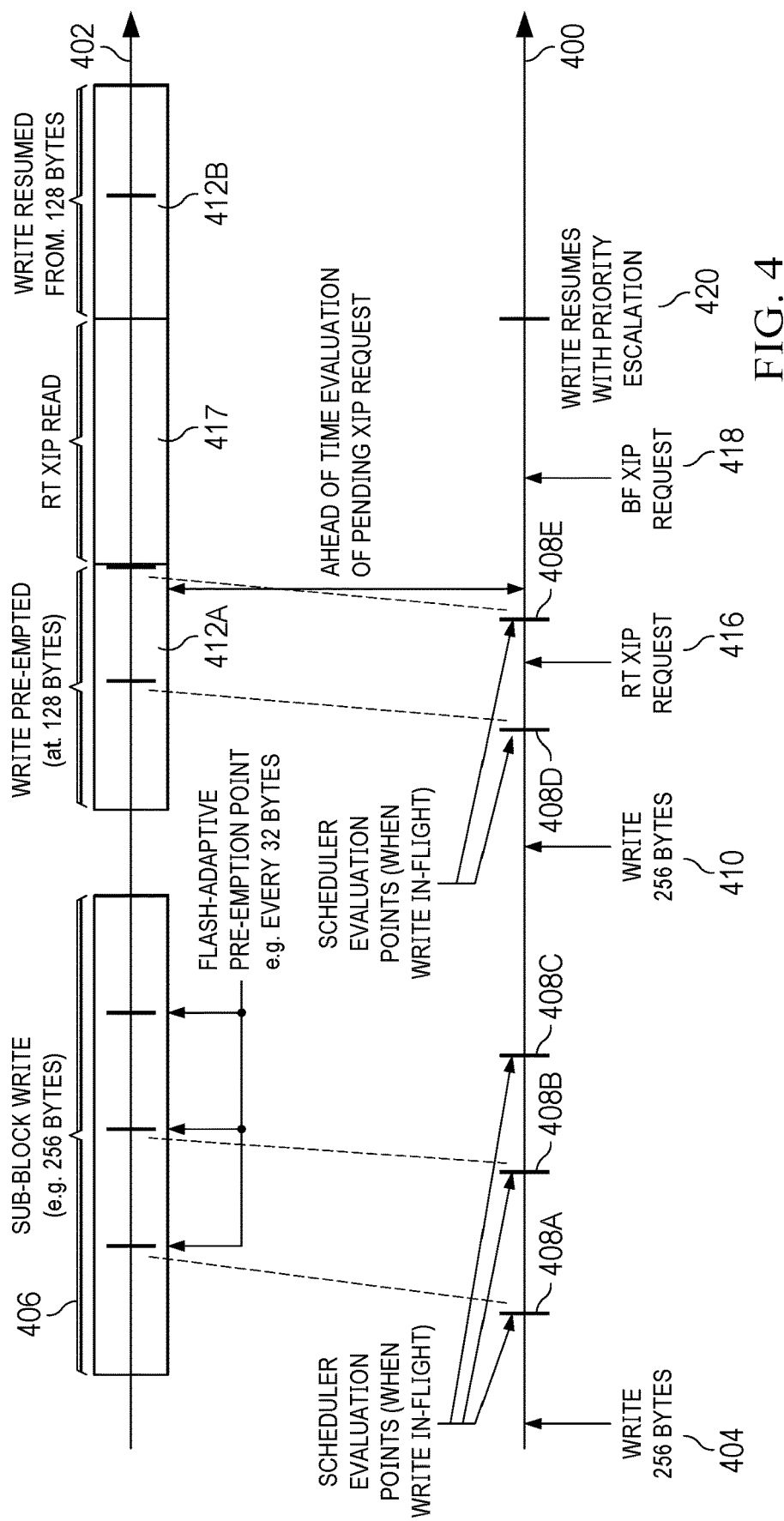
FIG. 4 is a timing diagram that illustrates a first example of write scheduler preemption.

FIG. 4 is a timing diagram that illustrates a first example of write scheduler preemption. FIG. 4 includes example timelines 400, 402. The example timeline 400 includes an example first write request 404, example scheduler evaluation points 408A-408E, an example second write request 410, an example RT XIP request 416, an example best effort (BF) XIP request 418, and a RT read XIP completion time 420. The example timeline 402 includes an example first write data sub-block 406, an example second write data sub-block 412, and an example RT XIP read operation 417. The example second write data sub-block 412 includes a stored portion 412A and a remaining portion 412B.

The example timeline 400 shows requests received and actions taken by the example AW2XIP circuitry 112. The example timeline 402 shows data that is sent by the AW2XIP circuitry 112 to the example flash controller circuitry 114, which forwards said data to the example flash memory 116. Both example timelines 400, 402 display time on the x axis. Both example timelines 400, 402 are aligned vertically such that a first item on the example timeline 402 placed to the left of a second item on the example timeline 402 occurs before the second item, and vice versa. Additionally, the illustrative example of FIG. 4 begins with each of the example request queues 204 initially empty.

The illustrative example of FIG. 4 begins when the example write preemption handler circuitry 212 adds the first write request 404 to the write queue 204C. In response to the first write request 404, the example scheduler circuitry 210 sends the first write data sub-block 406 to the example flash controller circuitry 114. While sub-blocks of write data are 256 bytes of data in the illustrative example of FIG. 4, in other examples, the sub-blocks of write data may be of any size or length.

The storage of 256 bytes of the example first write data sub-block into the example flash memory 116 takes an amount of time to complete. As a result, the example scheduler circuitry 210 periodically checks the RT XIP queue 204A to see if any high priority requests have been received during the write data storage. The periodic checks during the first example write data sub-block 406 occur at the example scheduler evaluation points 408A, 408B, 408C. While the example scheduler evaluation points 408A, 408B, 408C occur every 32 bytes in the illustrative example of FIG. 4, in other examples, scheduler evaluation points may occur at a different frequency. Because no RT XIP operations are received during the data storage, the example AW2XIP circuitry 112 sends the first example write data sub-block 406 to the example flash controller circuitry 114 without interruption.

Once the example write polling circuitry 216 verifies storage of the first example write data sub-block 406 is complete, the example write preemption handler circuitry 212 may add the second write request 410 to the example write queue 204C. In response, the example scheduler circuitry 210 may begin the storage of the second write data sub-block 412 to the example flash controller circuitry 114.

The example request aggregator circuitry 202 receives the example RT XIP request 416 after the second write data sub-block 412 data storage has begun, but before said data storage has completed. However, because the request is for a RT software application with critical time constraints, the example AW2XIP circuitry 112 prioritizes the RT XIP read operation over the write data storage. Therefore, when the scheduler circuitry 210 identifies the example RT XIP read operation at the example scheduler evaluation point 408E, the example write preemption handler circuitry 212 performs ahead of time evaluation for the pending XIP request. To perform ahead of time evaluation for a pending XIP request, the example write preemption handler circuitry 212 may determine an interim stopping point for the current storage of write data, save context information for the storage of write data at the interim stopping point, increase the prioritization value for the write context data, and instruct the example mode switcher circuitry 214 to switch the example flash controller circuitry 114 to switch from a write mode to a XIP read mode. In some examples, stopping the storage of write data at the interim stopping time may be referred to as write preemption. Upon completion of the ahead of time evaluation, the example scheduler circuitry 210 sends the RT XIP read operation 417 to the example flash controller circuitry 114.

The example request aggregator circuitry 202 receives the example best effort XIP request 418 after storage of the example second write data sub-block 412 data has begun, but before said data storage has completed. However, because the example best effort XIP request is for a non-RT software application, the example scheduler circuitry 210 prioritizes the completion of pre-empted second write data sub-block 412 over the best effort XIP request 418. Therefore, at the RT read XIP completion time 420, the example write preemption handler circuitry 212 may transmit the context data from the write data storage and instruct the mode switcher circuitry 214 to switch the example flash controller circuitry 114 back to write mode. The transmission of the context data and the switch to the write mode causes the example flash memory 116 to resume storing the remaining portion 412B of the second write data sub-block 412. While not illustrated in FIG. 4, the example components of the AW2XIP circuitry 112 may communicate to send the example best effort XIP request 418 to the example flash controller circuitry 114 after the storage of the second write data sub-block 412 is complete.

Advantageously, the illustrative example of FIG. 4 shows how the example write preemption handler circuitry 212 enables a RT XIP read operation to interrupt a write operation and reach the example flash memory 116 before the write operation completes. In doing so, the example AW2XIP circuitry 112 enables concurrent XIP read operations and write operations while also minimizing XIP downtime.

Figure 5:
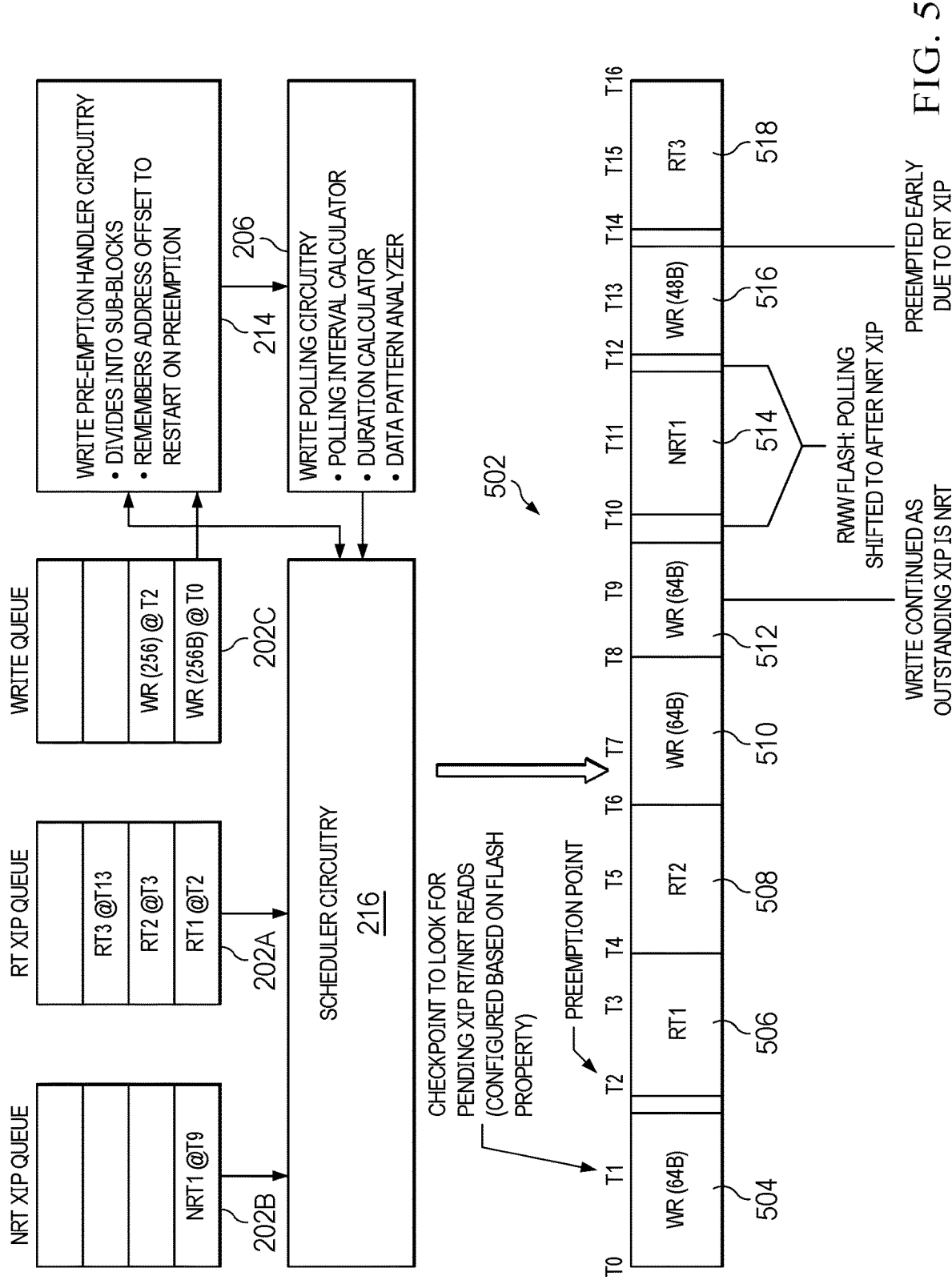
FIG. 5 is a timing diagram that illustrates a second example of write scheduler preemption.

FIG. 5 is a timing diagram that illustrates a second example of write scheduler preemption. FIG. 5 includes the example request queues 204, the write preemption handler circuitry 212, write polling circuitry 216, scheduler circuitry 210, and an example timeline 502. The example timeline 502 includes example write data 504, 510, 512, 516, example RT XIP data 506, 508, 518, and example best effort XIP data 514.

The example timeline 502 shows data that is sent from the example AW2XIP circuitry 112 to the example flash controller circuitry 114 across time. The timestamps on the example timeline 502 are numbered sequentially and positioned chronologically such that T0 occurs before T1, which occurs before T2, etc.

The example request queues 204 hold respective RT XIP read operations, best effort XIP read operations, or write operations as described previously in connection to FIG. 2. Entries in the example request queues 204 are annotated with a timestamp from the example timeline 502 to indicate when the example AW2XIP circuitry 112 enables the scheduler circuitry 210 to access the entries and provide the data to the example flash controller circuitry. The example scheduler circuitry 210 may access entries from the RT XIP queue 204A and best effort XIP queue 204B to the example scheduler circuitry 210 as soon as they are received by the request aggregator circuitry 202. In contrast, the example scheduler circuitry 210 may only access the example write queue 204C when it is in an enabled state. In the illustrative example of FIG. 5, the example write preemption handler circuitry 212 waits until enough write data is accumulated to divide the write data into sub-blocks before enabling the example write queue 204C. In other examples, the example write preemption handler circuitry 212 may enable the example write queue 204C upon receiving instructions from a software application. In some examples, the instructions from a software application may be referred to as a trigger signal.

The example write data 504 is last sub-block of an entry in the write queue 204C whose data storage begun before T0. The storage of the example write data 504 occurs from T0 to T2. At T2, the example write scheduler circuitry 210 checks the example request queues 204 and finds both RT1, an entry in the RT XIP queue 204A, and sub-blocks of write data enabled write queue 204C. While the total size of the write data sub-blocks is 256 bytes in the illustrative example of FIG. 5, in other examples, the total size of the write data sub-blocks may be different. The example scheduler circuitry 210 uses a prioritization method to determine that RT1 should be sent to the example flash controller circuitry 114 before the write data.

The example flash memory 116 performs operations corresponding to RT1 from T2 to T4. At T3, the example AW2XIP circuitry 112 receives another RT XIP read request, RT2. Because the example prioritization method indicates that RT XIP requests have highest priority, the example scheduler circuitry 210 transmits R2 at T4 instead of any write data sub-blocks.

The example flash memory 116 performs operations corresponding to R2 from T4 to T6. At T6, the example scheduler circuitry 210 transmits the first of the write data sub-blocks that were initially available at T2. In the illustrative example of FIG. 5, the example write preemption handler circuitry 212 divides 256 bytes of write data into four sub-blocks of 64 bytes each. In other examples, the example write preemption handler circuitry 212 may form a different number of sub-blocks and/or form differently sized sub-blocks. For example, in FIG. 4, a total of 512 bytes of data were divided into two sub-blocks of 256 bytes each. Storage of the first write data sub-block in the example flash memory 116 occurs from T6 to T8.

At T8, the example scheduler circuitry 210 transmits the second write data sub-block. At T9, the example AW2XIP circuitry 112 receives a best effort (i.e., non-RT) XIP read request, NRT1. At the next scheduler evaluation point, which occurs in-between T9 and T10, the example scheduler circuitry 210 uses the example prioritization method to determine that the NRT1 is prioritized such that it should be transmitted after storage of the current write data sub-block completes, but before the transmission of any additional data from the write queue 204C. Therefore, the example scheduler circuitry 210 instructs the mode switcher circuitry 214 to switch to the example flash controller circuitry 114 to a read mode. At T10, the example scheduler circuitry 210 begins to transmit NRT1 to the example flash controller circuitry 114.

The example write polling circuitry 216 may use the total size of the write data sub-blocks (256 bytes) and the amount of time it took to transmit a previous sub-block (from T0 to T2) to estimate the four sub-blocks of write data from T2 would complete at T10. In such an example, the example write polling circuitry 216 may place a polling operation corresponding to T10 at the top of the write queue 204C. The polling operation may be placed at the top of the example write queue 204C so that the example scheduler circuitry 210 accesses the polling request before accessing any sub-blocks from an additional 256 bytes of write data that were made available at T10. In FIG. 5, the example scheduler circuitry 210 moves the polling operation from T10 to T12 so it can transmit NRT1 at T10, which is a higher priority operation.

The example scheduler circuitry 210 transmits the third write data sub-block after the polling request completes. Because the polling request may be a smaller number of bytes than a write data sub-block or XIP read request, storage of the third write data sub-block may begin near T12. If uninterrupted, storage of the third sub-block of write data may be expected to complete at T14. However, an additional RT XIP request RT3 received at T13 may cause the example scheduler circuitry 210 to stop storing write data at the next scheduler evaluation point and may cause the mode switcher circuitry 214 to switch the example flash controller circuitry 114 to a read mode. The example flash memory receives the RT3 request and performs corresponding operations from T14 to T16. While not illustrated in FIG. 5, the example scheduler circuitry 210 may transmit write context data to the example flash memory 116 at T16, causing the example flash memory 116 to resume storing the remaining 16 bits of the third write data sub-block. After T16, the example scheduler circuitry 210 may also transmit the fourth write data sub-block from T2 and the additional sub-blocks from T10. The timing of the remaining sub-block data transmissions may depend on if and when the example compute cores 102A, 102B send additional XIP requests.

FIG. 5 illustrates how the prioritization method used by example scheduler circuitry 210 may be configured to meet the requirements of various software applications. For example, the prioritization method in FIG. 5 indicates that a best effort XIP read operation is prioritized highly enough to be sent before additional write data sub-blocks, but not highly enough to preempt the storage of a write data sub-block in progress. In other examples, the prioritization method may indicate that any XIP read operation, regardless of whether it is RT or non-RT, should cause the example scheduler circuitry 210 to preempt the storage of a write data sub-block in progress.

Figure 6:
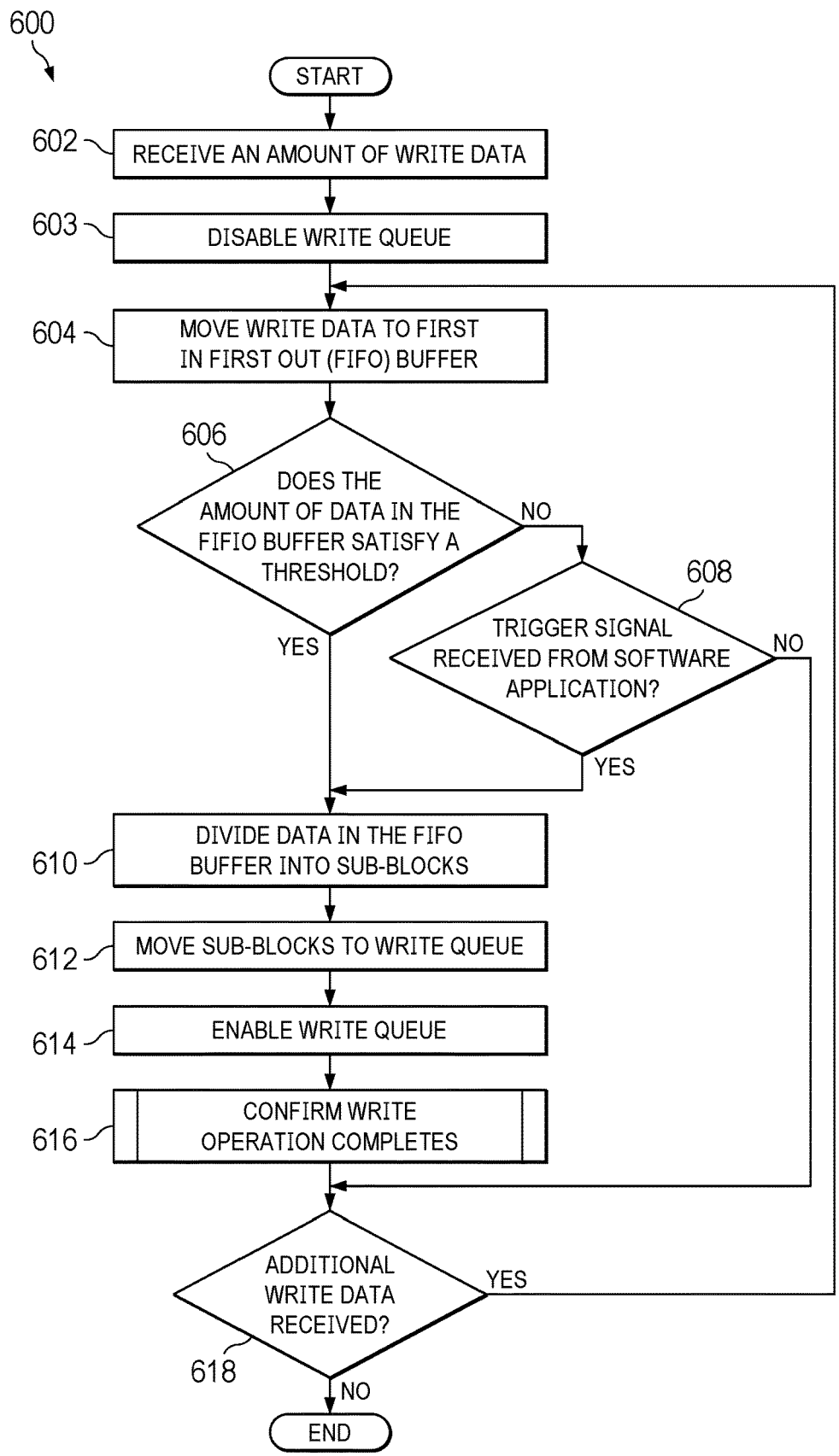
FIG. 6 is a flowchart representative of an example process that may be performed using machine readable instructions that can be executed and/or hardware configured to implement the write buffer circuitry of FIG. 2, and/or, more generally, the AW2XIP circuitry of FIG. 1.

FIG. 6 is a flowchart representative of an example process that may be performed using machine readable instructions that can be executed and/or hardware configured to implement the write preemption handler circuitry of FIG. 2, and/or, more generally, the AW2XIP circuitry of FIG. 1. The example machine readable instructions and/or operations 600 begin when the example AW2XIP circuitry 112 receives an amount of write data. (Block 602). Specifically, the example request aggregator circuitry 202 may receive a request to perform a write operation, and write data to be stored, from an example compute core 102A, 106B. The example request aggregator circuitry 202 may store the write data into the write queue 204C.

The example write preemption handler circuitry 212 disables the write queue 204C. (Block 603). Disabling the write queue 204C prevents the example scheduler circuitry 210 from attempting to switch modes and transmit write operations each time an amount of data is received at block 602.

The example write preemption handler circuitry 212 moves the write data from the example write queue 204C to the example FIFO buffer 208. (Block 604). The example FIFO buffer 208 may include additional data that was stored from a previous request.

The example write preemption handler circuitry 212 determines whether the amount of data in the example FIFO buffer 208 satisfies a threshold. (Block 606). To satisfy the threshold of block 606, the amount of data stored in the FIFO buffer 208 may be required to be greater or equal to a threshold value. If the amount of data in the example FIFO buffer 208 satisfies the threshold, the example machine readable instructions and/or operations 600 proceed to block 610.

If the amount of data in the example FIFO buffer 208 fails to satisfy the threshold of block 606, the example write preemption handler circuitry 212 may determine whether a trigger signal has been received from a software application. (Block 608). A software application signal may include a trigger signal as metadata in a write request sent by the example compute cores 102A, 102B. A software application may include a trigger signal in a write request for any reason. If the example write preemption handler circuitry 212 has not received a trigger signal, the example machine readable instructions and/or operations 600 may proceed to block 618.

If the amount of data in the example FIFO buffer 208 satisfied the threshold, or if the example write preemption handler circuitry 212 received a trigger signal from a software application, the example write preemption handler circuitry 212 may divide the data in the FIFO buffer 208 into sub-blocks. (Block 610). The example write preemption handler circuitry 212 may form sub-blocks such that each sub-block has the same amount of data.

The example write preemption handler circuitry 212 moves the write data sub-blocks back to the example write queue 204C. (Block 612). The example write preemption handler circuitry 212 may then enable the write queue 204C. (Block 614). By enabling the write queue 204C, the example write preemption handler circuitry 212 allows the scheduler circuitry 210 to access the write data sub-blocks and transmit them to the example flash controller circuitry 114 based on a prioritization method.

The example write polling circuitry 216 confirms when the write operation is complete. (Block 616). The example write polling circuitry 216 may disable the write queue 204C when confirming the write operation is complete. In some examples such as FIG. 5, the disabled mode of the example write queue 204C prevents the scheduler circuitry 210 from accessing the queue but does not prevent the example write preemption handler circuitry 212 from placing additional sub-blocks into the queue. In other examples, the example write preemption handler circuitry 212 may wait to perform additional processing until the example write polling circuitry 216 confirms all sub-blocks from block 612 have been stored in the example flash memory 116. Block 616 is described further in connection to FIG. 7.

The write preemption handler circuitry 212 determines if additional write data has been received by the example request aggregator circuitry 202. (Block 618). If additional write data has been received, the example machine readable instructions and/or operations 600 may return to block 604, where the write preemption handler circuitry 212 moves the additional data into the example FIFO buffer 208. If additional write data has not been received, the example machine readable instructions and/or operations 600 end.

Figure 7:
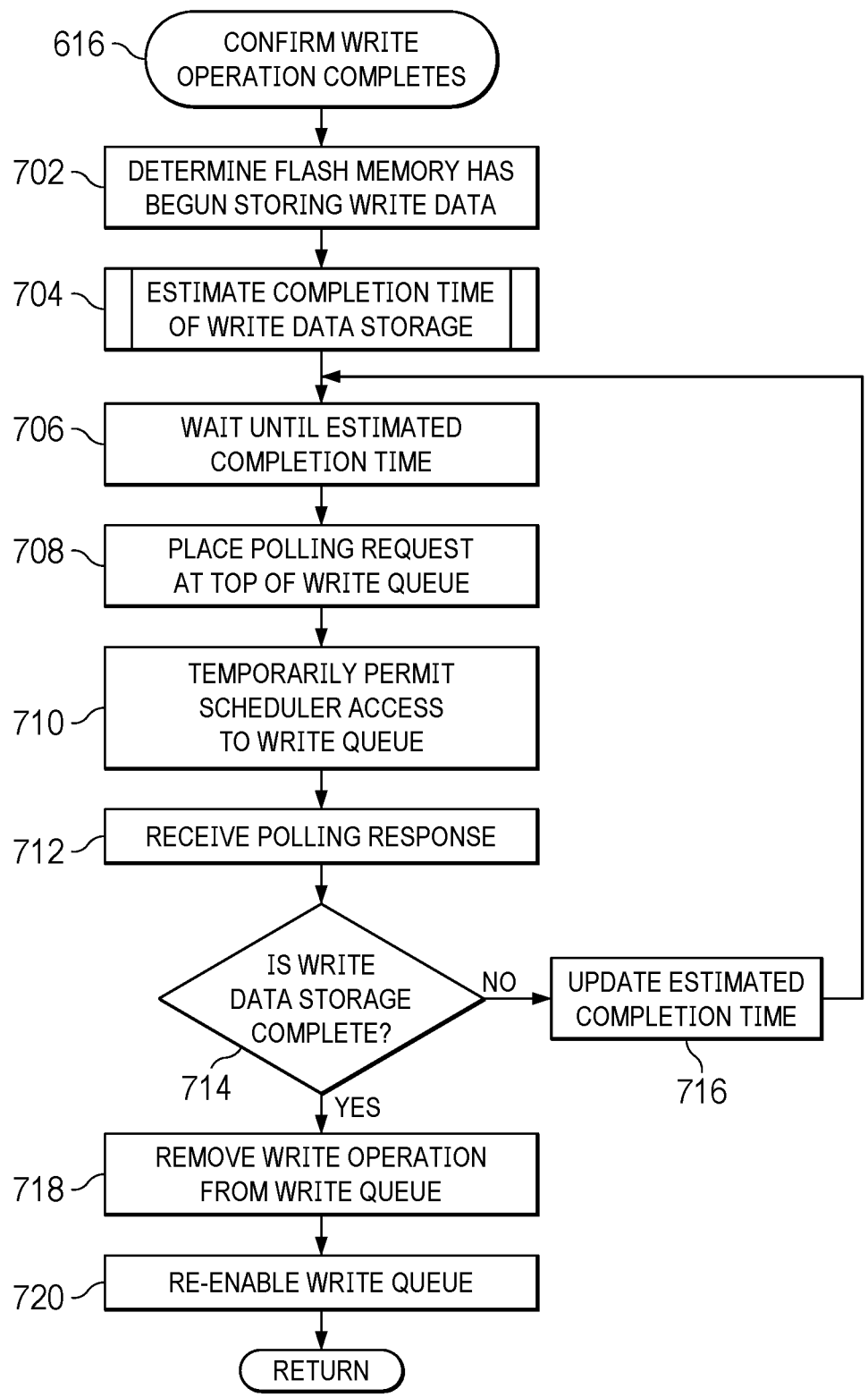
FIG. 7 is a flowchart representative of an example process that may be performed using machine readable instructions that can be executed and/or hardware configured to implement the write polling circuitry of FIG. 2, and/or, more generally, the AW2XIP circuitry of FIG. 1 to confirm a write operation completes as described in FIG. 6.

FIG. 7 is a flowchart representative of an example process that may be performed using machine readable instructions that can be executed and/or hardware configured to implement the example write polling circuitry 216 of FIG. 2, and/or, more generally, the AW2XIP circuitry of FIG. 1 to confirm a write operation completes as described in FIG. 6. Specifically, the flowchart of FIG. 7 shows how the example machine readable instructions and/or operations 600 implement block 616 of FIG. 6.

The implementation of block 616 begins when the example write data snooper circuitry 302 determines the example flash memory 116 has begun storing write data. (Block 702). Because the scheduler circuitry 210 prioritizes XIP read operations above write data stores, enabling the write queue 204C at block 614 may not immediately precede the start of a write data storage at block 702.

The example pattern analyzer circuitry 306 estimates a completion time of the write data storage. (Block 704). The example write polling circuitry 216 may disable the write queue 204C when estimating the completion time. Block 704 is described further in connection to FIG. 8.

The example write polling circuitry 216 waits until the estimated completion time. (Block 706). At the estimated completion time, the example write polling circuitry 216 may place a polling request at the top of the write queue 204C. (Block 708). A polling request may refer to an amount of data sent to the example flash controller circuitry 114 to determine whether transmission of the sub-blocks is complete.

The example write polling circuitry 216 temporarily permits the example scheduler circuitry 210 to access the write queue 204C. (Block 710). Specifically, the example write polling circuitry 216 may re-enable the write queue 204C, wait for the example scheduler circuitry 210 to access and send the polling request, and then re-disable the write queue 204C.

The example polling response analyzer circuitry 310 receives a polling response from the example flash memory 116 via the example flash controller circuitry 114. (Block 712). The example polling response analyzer circuitry 310 then uses the polling response to determine whether the storage of the write data sub-blocks is complete. (Block 714). To make the determination of block 714, the example polling response analyzer circuitry 310 may parse the polling response based on a communication standard used by the flash controller circuitry 114 and example AW2XIP circuitry 112 to send and receive data.

If the storage of the write data sub-blocks into the example flash memory 116 is not complete, the example pattern analyzer circuitry 306 updates the estimated completion time. (Block 716). The example pattern analyzer circuitry 306 may use similar techniques to update the completion time as the techniques used in block 704 to initially estimate the completion time. After block 716, the example machine readable instructions and/or operations 600 may return to block 706 where the example write polling circuitry 216 waits until the estimated completion time.

If the storage of the write data sub-blocks into the example flash memory 116 is complete, the example write polling circuitry 216 removes the write operation from the write queue 204C. (Block 718). In some examples, removing entries from the write queue 204C at block 718 may be referred to as retiring a write operation.

The example write polling circuitry 216 reenables the write queue 204C. (Block 720). In doing so, the example write polling circuitry 216 allows the example scheduler circuitry 210 to access and transfer any additional write data sub-blocks that may be in the write queue 204C. The example machine readable instructions and/or operations 600 return to block 618 after block 720.

The example machine readable instructions and/or operations 600 of FIG. 7 describe an example in which, at block 704, the example write polling circuitry 216 generates an estimated completion time for the storage of all write data sub-blocks from 610. In other examples, the example write polling circuitry 216 generates an estimated completion time for an individual write data sub-block at block 704. In such examples, a polling request is sent to the example flash memory 116 for each write data sub-block. Furthermore, in such examples, the example polling response analyzer circuitry 310 determines a first write data sub-block is complete at block 714, causing the example scheduler circuitry 210 to access and transfer a second write data sub-block at block 720, wherein both the first and second write data sub-blocks are included in the write data of block 610. In some examples, the transmission of the second write data sub-block at block 720 may cause the example machine readable instructions and/or operations 600 to return to block 704, where the example write polling circuitry 216 generates an estimated completion time for the storage of the second write data sub-block.

Figure 8:
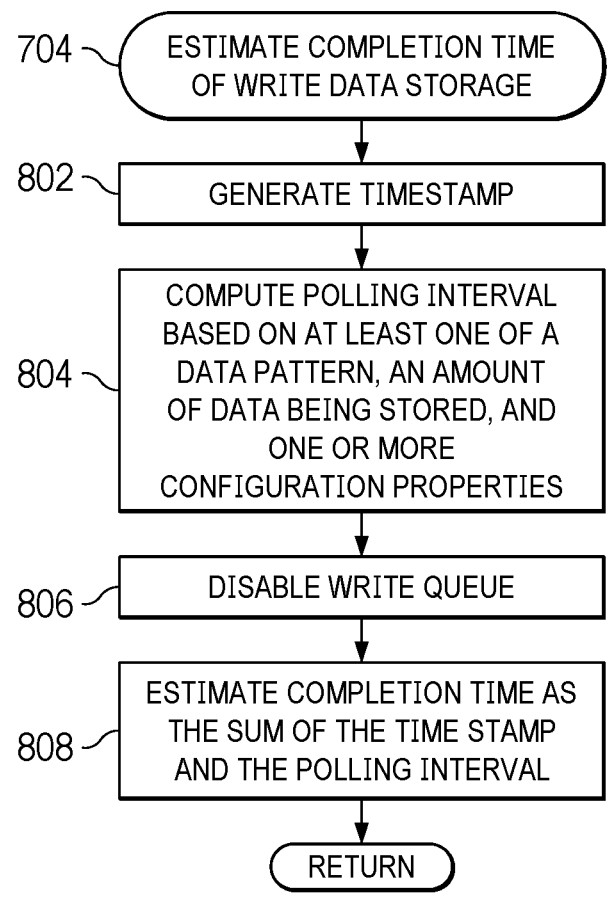
FIG. 8 is a flowchart representative of an example process that may be performed using machine readable instructions that can be executed and/or hardware configured to implement the pattern analyzer circuitry of FIG. 3, and/or, more generally, the AW2XIP circuitry of FIG. 1 to estimate completion time of a write operation as described in FIG. 7.

FIG. 8 is a flowchart representative of an example process that may be performed using machine readable instructions that can be executed and/or hardware configured to implement the example pattern analyzer circuitry 306 of FIG. 3, and/or, more generally, the AW2XIP circuitry of FIG. 1 to estimate completion time of a write operation as described in FIG. 7. Specifically, the flowchart of FIG. 8 shows how the example machine readable instructions and/or operations 600 implement block 704 of FIG. 7.

The example timestamp generator circuitry 304 generates a timestamp. (Block 802). The timestamp of block 802 describes when the example scheduler circuitry 210 begun transmission of the write sub-blocks of block 610. The example timestamp generator circuitry 304 may generate the timestamp in any format. To generate the timestamp, the example timestamp generator circuitry 304 may access a clock signal from a compute resource of the example SoC 100.

The example pattern analyzer circuitry 306 computes a polling interval based on at least one of: (a) a data pattern, (b) the amount of data being stored, and (c) one or more configuration properties. (Block 804). The polling interval of block 804 is an estimation of how long it will take for the storage of the write data sub-blocks to complete.

The example pattern analyzer circuitry 306 may consider any number of factors when determining the polling interval of block 804. For example, the data pattern may refer to an order that the example scheduler circuitry 210 sent data to the example flash controller circuitry 114. An example data pattern from FIG. 5 from T0 to T16 may be described as a full write sub-block, RT XIP read, RT XIP read, full write sub-block, full write sub-block, best effort XIP read, write sub-block, pre-empted write sub-block, and a RT XIP read. Additionally, the amount of data being stored may refer to the amount of data in a single write data sub-block and/or the number of write data sub-blocks from block 610. Furthermore, the configuration properties used by the example pattern analyzer circuitry 306 may describe, but is not limited to, performance characteristics of the example flash memory 116, the prioritization method used by the example scheduler circuitry 210, one or more software applications running on the example compute cores 102A, 102B, etc.

The example write polling circuitry 216 disables the example write queue 204C. (Block 806). By disabling the write queue, the example write polling circuitry 216 prevents the example scheduler circuitry 210 from accessing additional write data before the write operation of block 702 is complete.

The example polling request generator circuitry 308 estimates the completion time as the sum of the timestamp from block 802 and the polling interval of block 804. (Block 808). The example machine readable instructions and/or operations 600 return to block 706 after block 808.

Figure 9:
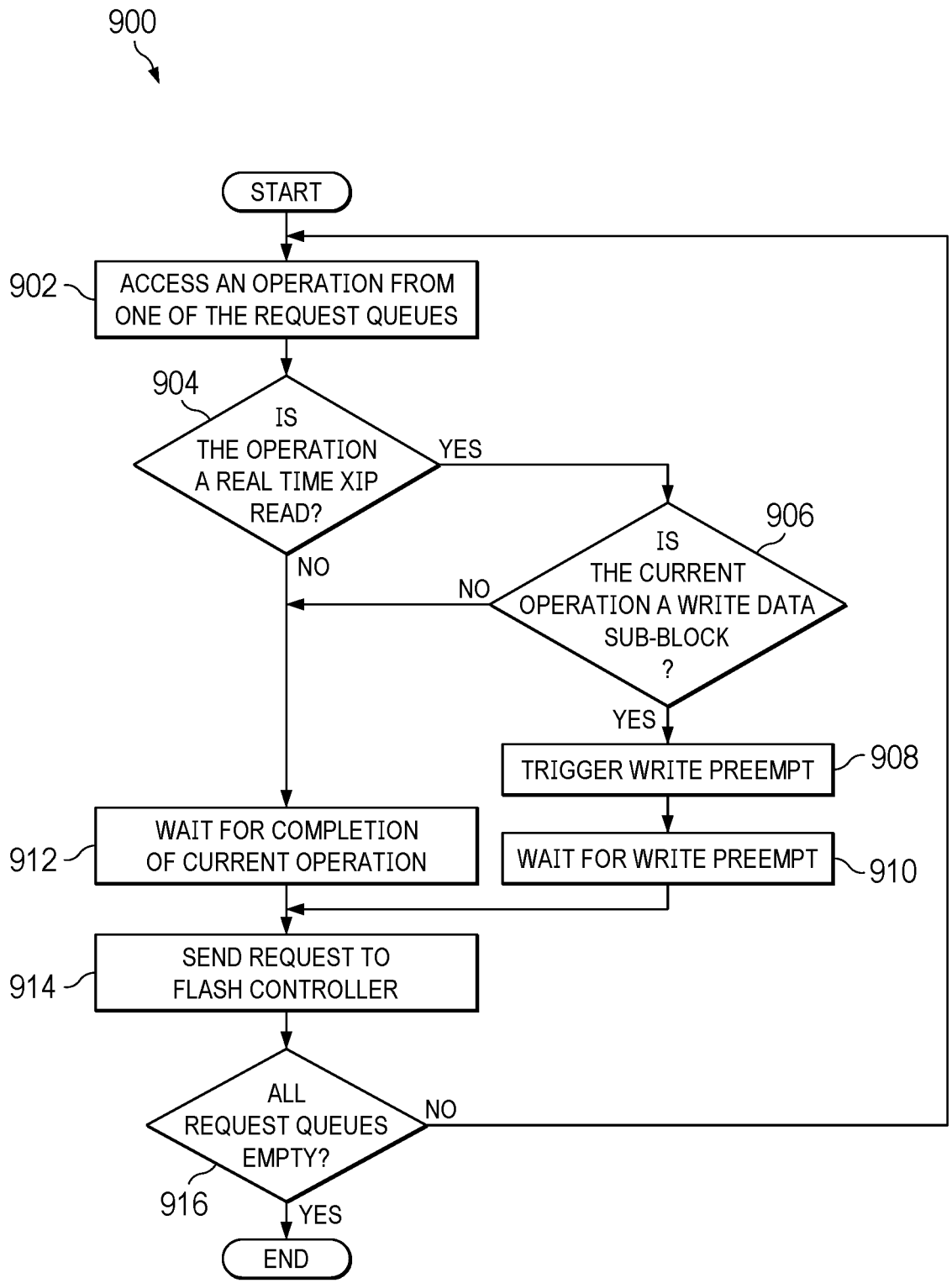
FIG. 9 is a flowchart representative of an example process that may be performed using machine readable instructions that can be executed and/or hardware configured to implement the scheduler circuitry of FIG. 2, and/or, more generally, the AW2XIP circuitry of FIG. 1 to schedule operation requests.

FIG. 9 is a flowchart representative of an example process that may be performed using machine readable instructions that can be executed and/or hardware configured to implement the scheduler circuitry 210 of FIG. 2, and/or, more generally, the AW2XIP circuitry 112 of FIG. 1 to provide data to the example flash controller circuitry 114. Specifically, the flowchart of FIG. 9 may describe an example implementation of a prioritization method used by the scheduler circuitry 210.

The example machine readable instructions and/or operations 900 begin when the example scheduler circuitry 210 accesses an operation from one of the example request queues 204. (Block 902). If more than one operation is stored within a single queue, the example scheduler circuitry 210 may access the operation at the top of the queue. If more than one of the example request queues 204 include an operation, the example scheduler circuitry 210 may determine which queue to access an operation from based a prioritization list. For example, the prioritization list of the illustrative examples in FIGS. 4, 5 is 1. RT XIP read operations, 2. write data sub-blocks that were previously pre-empted, 3. best effort XIP read operations, 4. write data sub-blocks that have not begun transmission. The example scheduler circuitry 210 may access a first operation from a first queue instead of a second operation from a second queue in response to a determination that the first operation is higher on the prioritization list than the second operation. In other examples, the prioritization list may be different.

The example scheduler circuitry 210 determines whether the operation is a RT XIP read. (Block 904). If the accessed operation is not a RT XIP read, the example machine readable instructions and/or operations 900 proceed to block 912.

If the accessed operation is a RT XIP read, the example scheduler circuitry 210 determines whether the current operation is storing a write data sub-block. (Block 906). A current operation refers to actions actively being performed by the example flash memory 116 when the example machine readable instructions and/or operations 900 implement block 906. For example, an operation may include obtaining data to respond to an XIP read request, obtaining data to respond to a best effort read request, storing a write data sub-block in response to a write request, etc. If the current operation is not storing a write data sub-block, the example machine readable instructions and/or operations 900 proceed to block 912.

If the current operation is a write data sub-block, the example scheduler circuitry 210 triggers a write preempt. (Block 908). To trigger a write pre-empt, the example scheduler circuitry 210 notifies the example write preemption handler circuitry 212.

The example scheduler circuitry 210 waits for the write preempt to complete. (Block 910). During the write pre-empt, the example write preemption handler circuitry 212 saves context information based on the amount of data that has been stored, indicates which data in the example write queue 204C has been pre-empted, and causes the example mode switcher circuitry 214 to switch the example flash controller circuitry 114 from a write mode to a read mode. After the write preemption is complete, the example machine readable instructions and/or operations 900 proceed to block 614.

The example scheduler circuitry 210 waits for the current operation to complete. (Block 912). An operation completes when the data that describes the operation has been fully transferred to the example flash controller circuitry 114. For example, a completed write operation may be delayed by a best effort XIP read operation data transfer, a completed best effort XIP operation may be delayed by a RT XIP read operation data transfer, etc. The example scheduler circuitry 210 may additionally or alternatively wait to complete the current operation data transfer if the accessed operation of block 902 comes from the same queue as the current operation.

The example scheduler circuitry 210 sends the operation to the flash controller circuitry 114. (Block 914). The transmission of the operation to the example flash controller circuitry 114 may take an amount of time. The amount of time may be influenced by the amount of data in the operation, the type of example flash memory 116, etc.

The example scheduler circuitry 210 determines whether all the request queues 204 are empty. (Block 916). The example scheduler circuitry 210 may perform the determination of block 916 before the data transfer of block 914 completes. Because an operation may remain in a queue until its data transfer is complete, the example scheduler circuitry 210 may specifically disregard an operation that is actively being transferred when performing the determination of block 916.

If the example scheduler circuitry 210 determines that not all request queues 204 are empty, the example machine readable instructions and/or operations 900 return to block 902. If the example scheduler circuitry 210 determines that all request queues 204 are empty, the example machine readable instructions and/or operations 900 end.

The flowchart of FIG. 9 is one example of a prioritization method implemented by the example scheduler circuitry 210. Advantageously, the prioritization method is configurable such that a manufacturer may determine how the scheduler circuitry 210 makes determinations. For example, in some applications, the example scheduler circuitry 210 may choose a request for a best effort time XIP operation before a request for a write data sub-block that has been previously preempted.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value.

Modifications are possible in the described embodiments, and other embodiments are possible, within the scope of the claims.

What is claimed is:

1. A device comprising:
a compute core configured to:
provide a first request to store first data in a memory; and
provide a second request to read second data from the memory; and
memory manager circuitry configured to:
cause storing of the first data in the memory in response to the first request; and
after the storing of the first data in the memory has begun and before the storing of the first data is complete,
receive the second request;
determine whether the second request is an Execute in Place (XIP) read request; and
based on a determination that the second request is an XIP read request,
interrupt the storing of the first data in the memory; and
cause reading of the second data from the memory.

2. The device of claim 1, wherein the memory manager circuitry is further configured to, based on a determination that the second request is not an XIP read request, wait until the storing of the first data is complete to cause the reading of the second data from the memory.

3. The device of claim 1, wherein the second request is a real-time (RT) XIP read request.

4. The device of claim 3, wherein the memory manager circuitry is further configured to:
after the storing of the first data in the memory has begun and before the storing of the first data is complete,
receive a third request to read third data from the memory, wherein the third request is a non-real time (non-RT) XIP read request; and
wait until the storing of the first data is complete to cause reading of the third data from the memory.

5. The device of claim 1, wherein the memory manager circuitry is further configured to store context data associated with resuming the storing of the first data in the memory.

6. The device of claim 1, wherein the memory manager circuitry is further configured to:
estimate a completion time of the storing of the first data in the memory.

7. The device of claim 6, wherein to estimate the completion time, the memory manager circuitry is further configured to estimate the completion time based on at least one of: (a) a pattern of data previously stored to the memory, (b) an amount of data in the first data, or (c) a configuration property.

8. The device of claim 6, wherein the memory manager circuitry is further configured to:
provide, at the estimated completion time, a request for a status indicating whether the storing of the first data in the memory is complete.

9. The device of claim 1, wherein the memory is a flash memory.

10. A method comprising:
receiving, at memory manager circuitry, a first request to store first data in a memory;
causing, by the memory manager circuitry in response to the first request, storing of the first data in the memory; and
after the storing of the first data in the memory has begun and before the storing of the first data is complete,
receiving, at the memory manager circuitry, a second request to read second data from the memory;
determining, by the memory manager circuitry, whether the second request is an Execute in Place (XIP) read request; and
based on determining that the second request is an XIP read request,
interrupting the storing of the first data in the memory; and
causing reading of the second data from the memory.

11. The method of claim 10, further including, based on determining that the second request is not an XIP read request, waiting until the storing of the first data is complete to cause the reading of the second data from the memory.

12. The method of claim 10, wherein the second request is a real-time (RT) XIP read request.

13. The method of claim 12, further including:
after the storing of the first data in the memory has begun and before the storing of the first data is complete,
receiving a third request to read third data from the memory, wherein the third request is a non-real time (non-RT) XIP read request; and
increasing a priority of the first request such that the storing of the first data is complete before reading of the third data from the memory.

14. The method of claim 10, further including storing context data associated with resuming the storing of the first data to the memory.

15. The method of claim 10, further including:
estimating a completion time of the storing of the first data in the memory.

16. The method of claim 15, wherein estimating the completion time includes estimating the completion time based on at least one of: (a) a pattern of data previously stored to the memory, (b) an amount of data in the first data, or (c) a configuration property.

17. The method of claim 15, further including:
providing, by the memory manager circuitry at the estimated completion time, a request for a status indicating whether the storing of the first data in the memory is complete.

18. The method of claim 10, wherein the memory is a flash memory.

19. A device comprising:
memory manager circuitry configured to:
receive a first request to store first data in a flash memory; and
after storing of the first data in the memory has begun and before the storing of the first data is complete,
receive a second request to read second data from the flash memory;
determine whether the second request is an Execute in Place (XIP) read request; and
based on a determination that the second request is an XIP read request,
interrupt the storing of the first data in the flash memory; and
cause reading of the second data from the flash memory.

20. The device of claim 19, wherein:
the second request is a real-time (RT) XIP read request; and
the memory manager circuitry is further configured to:
after the storing of the first data in the flash memory has begun and before the storing of the first data is complete,
receiving a third request to read third data from the flash memory, wherein the third request is a non-real time (non-RT) XIP read request; and
increasing a priority of the first request such that the storing of the first data is complete before reading of the third data from the flash memory.

* * * * *